United States Patent
Li et al.

(10) Patent No.: US 12,488,221 B2
(45) Date of Patent: Dec. 2, 2025

(54) UNSUPERVISED PRE-TRAINING OF NEURAL NETWORKS USING GENERATIVE MODELS

(71) Applicant: NVIDIA Corporation, Santa Clara, CA (US)

(72) Inventors: Daiqing Li, Oakville (CA); Huan Ling, Toronto (CA); Seung Wook Kim, Toronto (CA); Karsten Julian Kreis, Vancouver (CA); Antonio Torralba Barriuso, Somerville, MA (US); Sanja Fidler, Toronto (CA); Amlan Kar, Toronto (CA)

(73) Assignee: NVIDIA Corporation, Santa Clara, CA (US)

( * ) Notice: Subject to any disclaimer, the term of this patent is extended or adjusted under 35 U.S.C. 154(b) by 372 days.

(21) Appl. No.: 18/159,815

(22) Filed: Jan. 26, 2023

(65) Prior Publication Data
US 2024/0256831 A1   Aug. 1, 2024

(51) Int. Cl.
  *G06N 3/045* (2023.01)
  *G06T 5/70* (2024.01)
  *G06V 10/774* (2022.01)
  *G06V 10/82* (2022.01)

(52) U.S. Cl.
  CPC ............... *G06N 3/045* (2023.01); *G06T 5/70* (2024.01); *G06V 10/7753* (2022.01); *G06V 10/82* (2022.01)

(58) Field of Classification Search
  CPC ...... G06N 3/045; G06N 3/0455; G06V 10/82; G06V 10/7753; G06T 5/70
  See application file for complete search history.

(56) References Cited

U.S. PATENT DOCUMENTS

| | | | |
|---|---|---|---|
| 10,922,793 B2* | 2/2021 | Baek | G06T 3/4046 |
| 12,210,585 B2* | 1/2025 | Zhang | G06N 3/088 |
| 2019/0188882 A1* | 6/2019 | Son | G06N 3/047 |
| 2022/0067983 A1 | 3/2022 | Fidler et al. | |
| 2022/0084204 A1 | 3/2022 | Li et al. | |
| 2022/0269937 A1 | 8/2022 | Kim et al. | |
| 2022/0383570 A1 | 12/2022 | Ling et al. | |
| 2023/0066897 A1* | 3/2023 | Liu | G06T 17/05 |
| 2023/0095092 A1 | 3/2023 | Xiao et al. | |
| 2023/0114734 A1* | 4/2023 | Moon | G06N 3/0475 |
| | | | 382/103 |
| 2023/0360407 A1* | 11/2023 | Tang | G01C 21/3841 |
| 2024/0161462 A1* | 5/2024 | Gandelsman | G06T 5/60 |

* cited by examiner

*Primary Examiner* — Daniel G Mariam
(74) *Attorney, Agent, or Firm* — Foley & Lardner LLP

(57) ABSTRACT

In various examples, systems and methods are disclosed relating to generating a response from image and/or video input for image/video-based artificial intelligence (AI) systems and applications. Systems and methods are disclosed for a first model (e.g., a teacher model) distilling its knowledge to a second model (a student model). The second model receives a downstream image in a downstream task and generates at least one feature. The first model generates first features corresponding to an image which can be a real image or a synthetic image. The second model generates second features using the image as an input to the second model. Loss with respect to first features is determined. The second model is updated using the loss.

18 Claims, 12 Drawing Sheets

UNSUPERVISED PRE-TRAINING OF NEURAL NETWORKS USING GENERATIVE MODELS

BACKGROUND

Conventional supervised and unsupervised pre-training methods for image-based and video-based artificial intelligence (AI) rely on object-centric datasets, such as ImageNet, for pre-training tasks involving image recognition, object identification, and computer-vision AI. An AI model or backbone pre-trained using conventional pre-training methods is subsequently fine-tuned for downstream tasks using in-domain data. The reliance on object-centric datasets, when such datasets are not curated carefully, can suffer from the lack of diversity and flexibility in pre-training datasets which may bear mere tangential relevance to the downstream tasks that the backbone is trained to perform, therefore resulting in poor training efficiency and increased pre-training costs. These challenges are especially pronounced in scenarios in which the object-centric, large-scale datasets are assembled by third-party service providers who are unaware of the objectives and characteristics of the AI model to be trained.

SUMMARY

Embodiments of the present disclosure relate to unsupervised or semi-supervised pre-training, for example, using generative models and large-scale, unlabeled data or fraction labels to improve accuracy in downstream tasks such as image recognition, object identification, object detection, segmentation, and so on. The pre-training methods described herein can leverage unlabeled data for pre-training, which may not require labeled datasets. Features output from generative models can be distilled into a commonly used vision backbone. In some examples, feature distillation, which refers to distilling generative features to target backbones, as a general pre-training mechanism that does not require any labels, can be employed. Feature distillation can be used in unsupervised representation learning, where no labels are available during pre-training. In some examples, label distillation, which refers to using task-heads on top of generative networks for distilling labels onto target backbones in a semi-supervised regime, can be employed. Label distillation can be used in semi-supervised representation learning based on a fraction of labels. The cost of pre-training, the accuracy of the trained backbone, and/or the overall training efficiency can be improved.

At least one aspect relates to a processor. The processor can include one or more circuits to generate, using a first model (e.g., a teacher model), an image and a plurality of first features corresponding to the image. The one or more circuits can generate, using a second model (e.g., a student model), a plurality of second features using the image as an input to the second model, and may determine loss of the plurality of second features with respect to the plurality of first features. The one or more circuits can may update the second model using the loss, and can generate, using the second model, a response based on an input image.

The second model can receive a downstream image. The second model may generate, by applying the downstream image as input, at least one feature.

The first model includes a generative model, in some non-limiting implementations. The second model can include at least one of an encoder or a decoder. Generating the image can include sampling a random noise, and generating the image and the plurality of first features according to the random noise.

The one or more circuits are to update the first model using unlabeled data, in one non-limiting example implementation. The unlabeled data can include unlabeled data for a domain, or unlabeled data for more than one domain.

The plurality of first features can include a representation of an activation map or feature map, from the first model. The plurality of second features can include multiscale features.

The plurality of first features can have first attributes including at least one of a first spatial resolution, a first channel dimension, or a first feature dimension. The plurality of second features can have second attributes including at least one of a second spatial resolution, a second channel dimension, or a second feature dimension. The first spatial resolution can be different from the second spatial resolution. The first channel dimension can be different from the second channel dimension. The first feature dimension can be different from the second feature dimension.

In one or more embodiments, the one or more circuits aligns second attributes of the plurality of second features to first attributes of the plurality of first features by fusing, using one or more neural network blocks, the plurality of second features into a fused feature and generating a plurality of third features from the fused feature, in one example implementation. The plurality of third features can have third attributes that are aligned with the first attributes.

The first attributes can include at least one of a first spatial resolution, a first channel dimension, or a first feature dimension. The third attributes may include at least one of a third spatial resolution, a third channel dimension, or a third feature dimension. The first spatial resolution can be the same as the third spatial resolution. The first channel dimension can be the same as the third channel dimension. The first feature dimension can be same as the third feature dimension.

The one or more circuits may determine the loss of the plurality of second features with respect to the plurality of first features, which may include determining an attention loss between the plurality of first features and the plurality of second features, with the plurality of first features including a representation of an activation map.

The one or more circuits may determine the loss of the plurality of second features with respect to the plurality of first features, which includes determining a plurality of third features using the plurality of first features and determining regression loss between the plurality of first features and the plurality of third features, the plurality of first features including a representation of a feature map.

The processors, systems, and/or methods described herein can be implemented by or included in any system that generates a response or output based on input image or video data, such as at least one of a system associated with an autonomous or semi-autonomous machine (e.g., an AI driver, an in-vehicle infotainment system, and so on); a system for performing simulation operations; a system for performing digital twin operations; a system for performing light transport simulation; a system for performing collaborative content creation for 3D assets; a system for performing deep learning operations; a system implemented using an edge device; a system implemented using a robot; a system for generating or presenting virtual reality (VR) content, augmented reality (AR) content, and/or mixed reality (MR) content; a system for performing conversational AI operations; a system for generating synthetic data;

a system incorporating one or more virtual machines (VMs); a system implemented at least partially in a data center; or a system implemented at least partially using cloud computing resources.

BRIEF DESCRIPTION OF THE DRAWINGS

The present systems and methods for generating responses from image/video data for image/video-based AI systems and applications are described in detail below with reference to the attached drawing figures, wherein.

DETAILED DESCRIPTION

Figure 1:
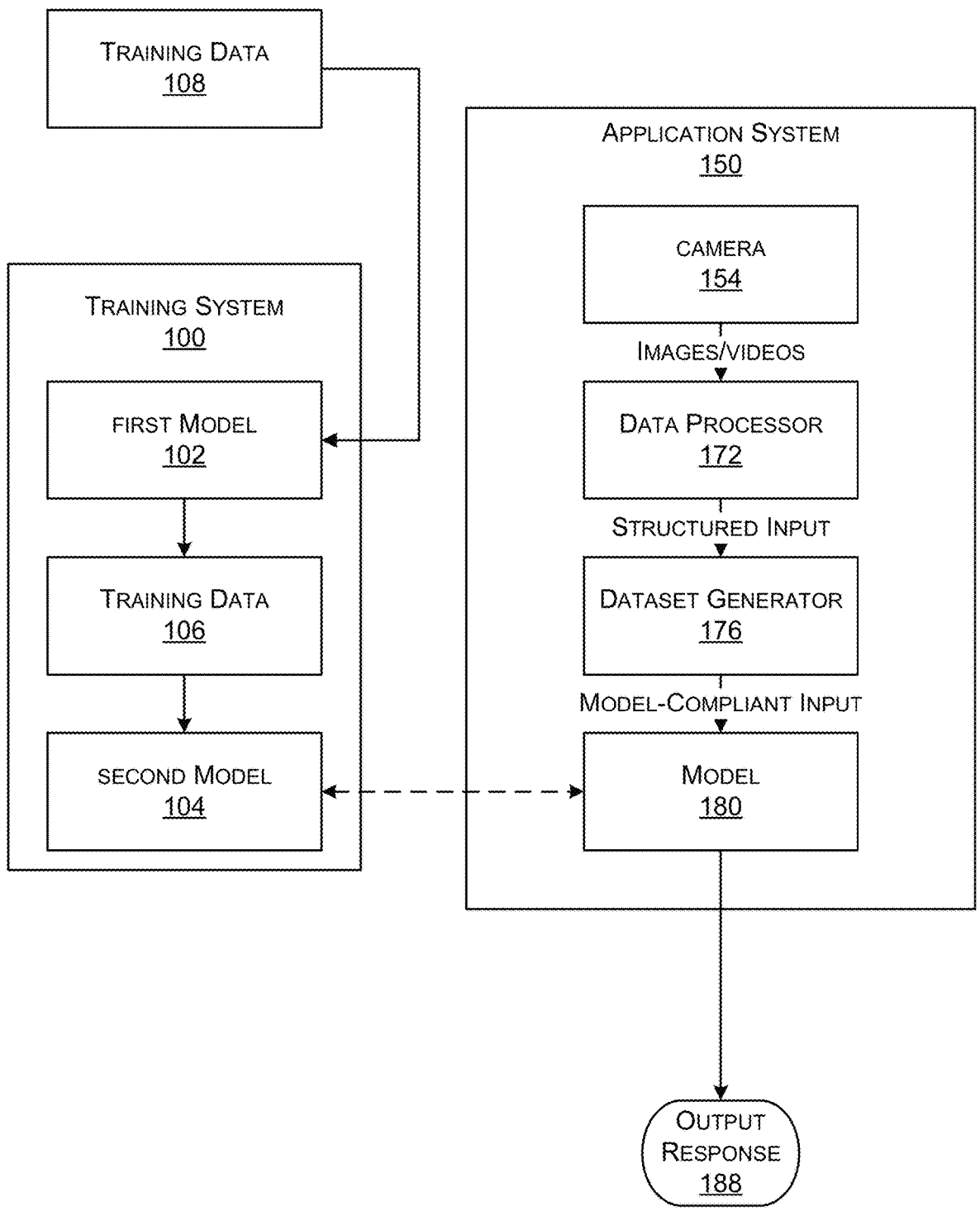
FIG. 1 is a block diagram of an example computing environment for training and operating machine learning models.

Systems and methods are disclosed related to using one or more neural network or machine learning models (alternatively referred to herein as "models") to generate responses or outputs based on input data such as images and videos.

There is a vast number of databases that contain large-scale unlabeled data, such as images and videos captured and stored in memory devices and databases. Such data can be captured using vehicle dash cameras, cameras located on a vehicle (e.g., an autonomous vehicle, Unmanned Aerial Vehicle (UAV), Unmanned Ground Vehicle (UGV), a manually driven vehicle, etc.), security cameras, cameras on public infrastructures (e.g., red light cameras), laptop cameras, webcams, action cameras, online video contents, cameras on medical devices and surgical tools, images and videos on the Internet, and so on. The unlabeled data may be referred to as raw data as it is not curated or labeled, and is not object-centric. The unlabeled data can be out-of-domain data or data for two or more domains, referred to as unlabeled general data, which is data that is unrelated to or is not used in the downstream tasks, or is data that has an unknown or unclear relationship with the downstream tasks or application. The unlabeled data can be in-domain data, referred to as unlabeled in-domain data, which is data that is related to or is used in the downstream tasks or application.

A first model can include a generative model. A generative model is a statistical model that can generate new instances of data (e.g., new, artificial images or videos) using existing data (e.g., existing images or videos). Non-limiting examples of the generative model include a generative adversarial network (GAN), style-based GAN (StyleGAN), BigGAN, cross-modal based GAN (CM-GAN), diffusion models such as Denoising Diffusion Probabilistic Models (DDPM), transformer-based models, and so on. The first model can be referred to as a teacher or a teacher neural network.

In some arrangements, the generative model is trained using unlabeled data, such as the unlabeled general data and/or the unlabeled in-domain data. After the generative model is trained, a random noise is sampled. The sampled random noise is passed to a generator implementing the generative model, to generate artificial data (e.g., synthetic or artificial images). For each output artificial image, the generative model can output a corresponding representation including a plurality of first features. The artificial image and the corresponding plurality of first features can form a pair of outputs.

The artificial image is passed to a vision backbone or processing system, which includes at least one of an encoder or a decoder. The vision backbone can include or represent an AI model to be trained, and is sometimes referred to herein as a second model. The vision backbone can be referred to as a feature pyramid network. The second model can be referred to as a student or a student network, as insights gained by the first model can be distilled into the second model.

The encoder may receive the artificial image and can generate an output. The decoder can receive the output from the encoder and can output a plurality of second features. Examples of the second features include multiscale features. The second features may have different spatial resolutions, channel dimensions, and/or feature dimensions as compared to the first features.

The plurality of second features can be fused (e.g., processed, weighted, combined, etc.) using neural network blocks. The outputs of the neural network blocks are each input to a respective one of a plurality of regressors, in one implementation. The regressors may align the attributes or dimensionality (e.g., the spatial resolutions, channel dimensions, or feature dimensions) of the second features to the attributes of the first features. For example, the outputs of the regressors can include a plurality of third features that have the same attributes (e.g., the same spatial resolutions, channel dimensions, and/or feature dimensions).

The loss (of the second features) with respect to the first features can be determined and used to update the second model. The loss can be the sum or combination of multiple types of loss including attention loss, regression loss, knowledge distillation loss, softmax activation plus a cross-entropy loss (softmax) loss, and so on. For example, the attention loss between the plurality of first features (e.g., the intermediate activation map) and the plurality of second features can be determined. For each channel dimension of the first features, the maximum activation (e.g., the maximum activated pixel In the feature space) is identified. For each channel dimension of the second features, the maximum activation (e.g., the maximum activated pixel in the feature space) may be identified. The attention loss can be determined using the maximum activation for the first features and the maximum activation for the second features. The attention loss can measure or represent the degree to which the second model can mimic (e.g., replicate, reproduce, model) the feature activation of the first model.

Moreover, and as a non-limiting example, the regression loss (e.g., mean square error) between the plurality of first features (e.g., intermediate feature map) and the plurality of third features can be determined. Given that the first and third features can have the same attributes or dimensionality, mean square error can be used to determine the regression loss. The regression loss can measure the preservation of the contact or the features themselves of the first model by the second model.

The model, responsive to receiving the input, can generate an output (e.g., features) representing a response to be presented responsive to at least one image or at least one video. The systems and methods described herein may be used for a variety of purposes related to image/video based applications, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be included in a variety of different systems such as automotive systems (e.g., AI driver, an in-vehicle infotainment system, and so on), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more VMs, systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 illustrates an example computing environment including a training system 100 and an application system 150 for training and deploying machine learning models, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The training system 100 can train or update one or more machine learning models 104. For example, the training system 100 can include a first model 102 (e.g., a teacher) that is used to train a second model 104 (e.g., a student).

The first model 102 can include one or more neural networks. A neural network can include an input layer, an output layer, and/or one or more intermediate layers, such as hidden layers, which can each have respective nodes. The first model 102 can include various neural network models, including models that are effective for operating on images and videos (e.g., frames of videos). The first model 102 can include one or more convolutional neural networks (CNNs), one or more residual neural networks (ResNets), other network types, or various combinations thereof. The first model 102 can include a generative model, which can include a statistical model that can generate new instances of data (e.g., new, artificial, synthetic data such as artificial, synthesized, or synthetic images or videos) using existing data (e.g., existing images or videos). The new instances of data is referred to as training data 106. The existing data is referred to as training data 108. In other words, the first model 102 can be any generative model that can generate the training data 106 as output using the training data 108 as input. Examples of the generative model include a GAN, StyleGAN, BigGAN, CM-GAN, diffusion models (e.g., DDPMs), transformer models, and so on. The first model 102 can be referred to as a teacher model or teacher neural network.

The second model 104 can be a vision backbone or a feature pyramid network. The second model 104 can include one or more neural networks. The neural network can include an input layer, an output layer, and/or one or more intermediate layers, such as hidden layers, which can each have respective nodes. The training system 100 can train the second model 104 (e.g., the neural network) by modifying or updating one or more parameters, such as weights and/or biases, of various nodes of the neural network responsive to evaluating candidate outputs of such neural network. The second model 104 can include various neural network models, including models that are effective for operating on images and videos (e.g., frames of videos). The second model 104 can include one or more CNNs, one or more ResNets, other network types, or various combinations thereof. The first model 102 and the second model 104 can be a same type of neural network. In some examples, both the first model 102 and the second model 104 can be CNNs. In some examples, both the first model 102 and the second model 104 can be ResNets. The second model 104 can be referred to as a student model or student neural network.

The training system 100 can train or update the second model 104 by applying as input training data 106 generated by the first model 102. The training data 106 can be (or be provided to) an input layer of a neural network of the second model 104. The training system 100 can train or update the first model 102 by applying as input the training data 108. The training data 108 can be (or be provided to) an input layer of a neural network of the first model 102.

The training data 108 can include unlabeled data. The unlabeled data can include raw image or video (e.g., frames) data that is not curated or labeled, and is not object-centric. The unlabeled data can include out-of-domain data, referred to as unlabeled general data, which is data that is unrelated to or is not used in the downstream tasks. The unlabeled general data can include data that has an unknown or unclear relationship with the downstream tasks. The unlabeled data can be in-domain data, referred to as unlabeled in-domain data, which is data that is related to or is directly used in the downstream tasks.

The first model 102 (e.g., the generative model) is trained or updated using the training data 108 to allow the first model 102 to output new instances of data (e.g., new, artificial, synthetic data such as artificial or synthetic images or videos). As used herein, an image can be a standalone image or a frame of a video, where a video is a collection of two or more frames. For example, after the first model 102 is trained, a random noise is sampled. The sampled random noise is passed to a generator implementing the first model 102, to generate synthetic data (e.g., synthetic images). For each output synthetic image, the first model 102 can output a corresponding representation including a plurality of first features. The synthetic images and the corresponding plurality of first features can form a pair of outputs referred to as the training data 106.

The first features outputted from the first model 102 can be distilled into the second model 104. For example, the synthetic images generated by the first model 102 may be passed to the second model 102, which includes an encoder and/or a decoder. For example, the encoder receives the synthetic image and generates an output. The decoder can receive such output from the encoder and can output a plurality of second features such as multiscale features. The second features can have different spatial resolutions, channel dimensions, and/or feature dimensions as compared to the first features.

The second features can be fused using neural network blocks. The outputs of the neural network blocks can each input to a respective one of a plurality of regressors. The regressors can align the attributes or dimensionality (e.g., the spatial resolutions, channel dimensions, or feature dimensions) of the second features to the attributes of the first features. For example, the outputs of the regressors can include a plurality of third features that have the same attributes (e.g., the same spatial resolutions, channel dimensions, or feature dimensions, etc.).

The second features and/or the third features can be used to evaluate whether the second model 104 has been trained/updated sufficiently to satisfy a target performance metric, such as a metric indicative of accuracy of the second model 104 in generating outputs. Such evaluation can be performed based on various types of loss, including attention loss determined between the first features and the second features, regression loss determined between the first features and the third features, knowledge distillation loss between the first features and the third features, softmax loss between the first features and the second and/or third features, and so on. A total/aggregate loss can be calculated to be the sum or a combination of one or more of the types of loss.

For example, the training system 100 can use a function such as a loss function (e.g., the first loss, the second loss, or the total loss) to evaluate a condition for determining whether the second model 104 is configured (sufficiently) to meet the target performance metric. The condition can be a convergence condition, such as a condition that is satisfied responsive to factors such as an output of the function meeting the target performance metric or threshold, a number of training iterations, training of the second model 104 converging, or various combinations thereof. For example, the function can be of the form of a mean error, mean squared error, or mean absolute error function.

The training system 100 can iteratively apply the training data 108 to update the first model 102, generate the training data 106 using the first model, apply the training data 106 to the second model 104, evaluate the loss responsive to applying the training data 106, and/or modify (e.g., update one or more weights and biases of) the second model 104. The training system 100 can modify the second model 104 by modifying at least one of a weight or a parameter of the second model 104. The training system 100 can evaluate the function by comparing an output of the function to a threshold of a convergence condition, such as a minimum or minimized cost threshold, such that the second model 104 is determined to be sufficiently trained (e.g., sufficiently accurate in generating outputs) responsive to the output of the function being less than the threshold. The training system 100 can output the second model 104 responsive to the convergence condition being satisfied.

The application system 150 can operate or deploy a model 180 to generate responses to input data (e.g., input images, input videos, and so on). The application system 150 can be a system to provide outputs based on images and/or videos. The application system 150 can be a system that provides services for a particular domain or domains, which may or may not correspond to the domains of the training data 108 used to update the second model 104 as described. The application system 150 can be implemented by or communicatively coupled with the training system 100, or can be separate from the training system 100.

The model 180 can be or be received as the second model 104, a portion thereof, or a representation thereof. For example, a data structure representing the second model 104 can be used by the application system 150 as the model 180. The data structure can represent parameters of the trained second model 104, such as weights or biases used to configure the model 180 based on the training of the second model 104. In some examples, the model 180 is the encoder of the second model 104.

The application system 150 can include a camera 154 that outputs images or videos (e.g., frames). Examples formats of the camera 154 includes JPEG, GIF, PNG, WMV, FLV, 3GPP, 2GPP2, M4V, and so on. In some examples, instead of or in addition to the camera 154, the images and videos can be obtained from a memory device or a database local to the application system 150 or received from a memory device, database, datacenter, or server via a suitable network.

The data processor 172 can be or include any function, operation, routine, logic, or instructions to perform functions such as processing the images/videos received from the camera 154 to generate a structured input, such as a structured image's data structure. For example, the data processor 172 can segment a video into frames, each of which is an image. The data processor 172 can provide the structured input to a dataset generator 176.

The dataset generator 176 can be or include any function, operation, routine, logic, or instructions to perform functions such as generating, based at least on the structured input, an input compliant with the model 180. For example, the model 180 can be structured to receive input in a particular format, such as a particular image format or file type, which may be expected to include certain types of values. The particular format can include a format that is the same or analogous to a format by which the training data 106 is applied to the second model 104 to train the second model 104. The dataset generator 176 can identify the particular format of the model 180, and can convert the structured input to the particular format. For example, the dataset generator 176 can convert the structured input in GIF to a JPEG file.

The data processor 172 and the dataset generator 176 can be implemented as discrete functions or in an integrated function. For example, a single functional processing unit can receive the images/videos and can generate the input to provide to the model 180 responsive to receiving the images/videos.

The model 180 can generate an output response 188 (e.g., features) responsive to receiving the input (e.g., responsive to receiving the input from the dataset generator 176). The model output can represent a response to the images/videos.

Figure 2A:
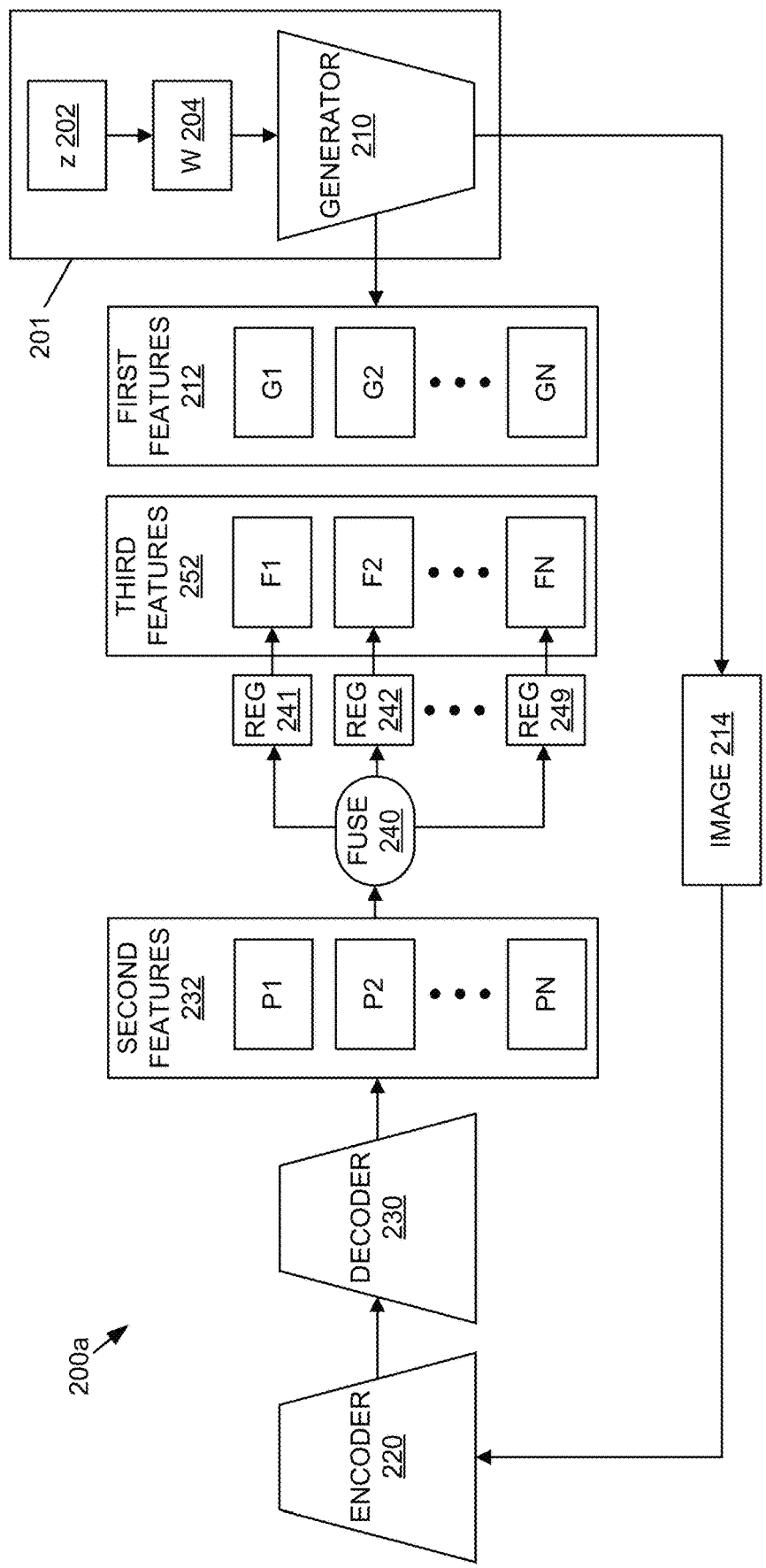
FIG. 2A is a block diagram of an example of an unsupervised pre-training method for a machine learning model to output features using a synthesized dataset.
Figure 2B:
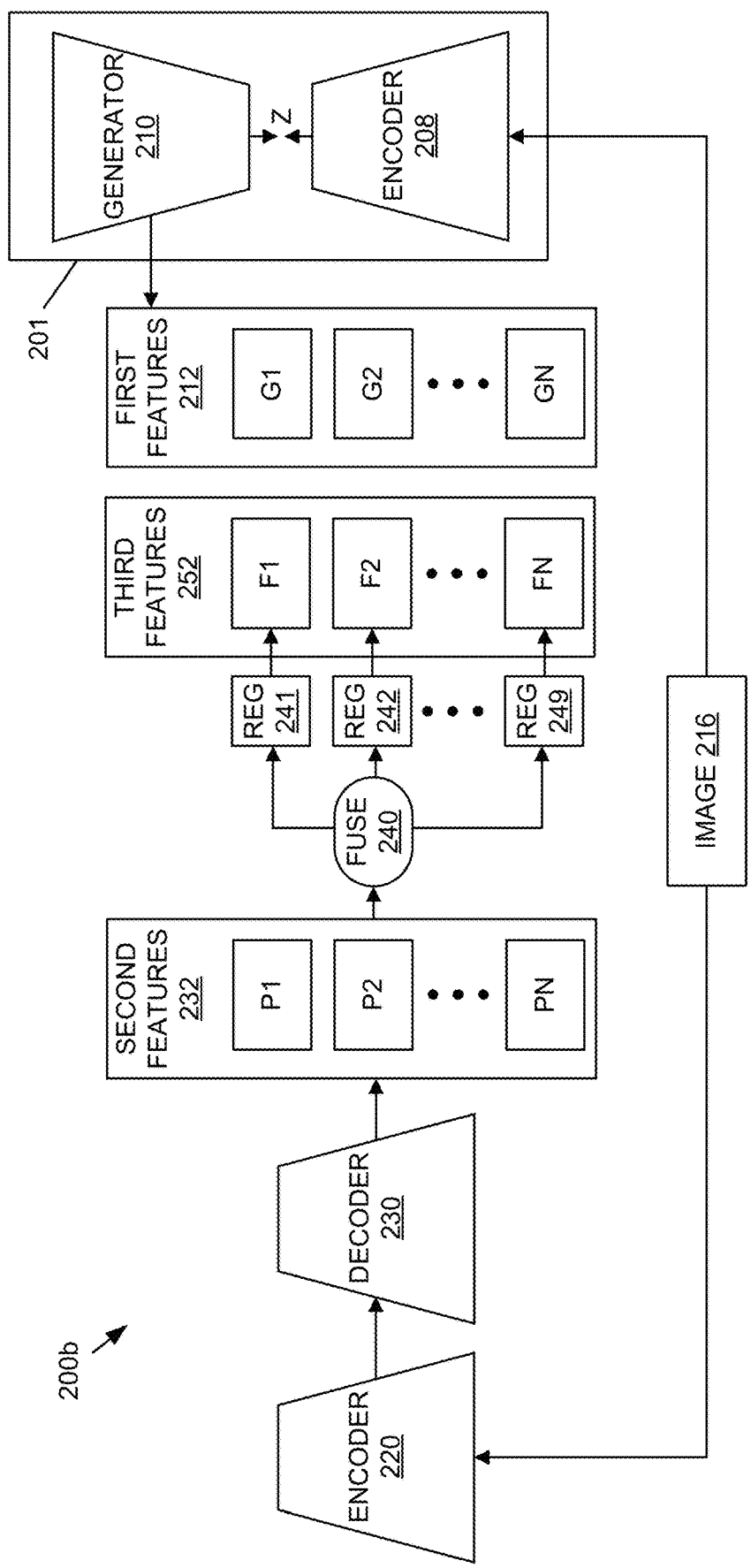
FIG. 2B is a block diagram of an example of an unsupervised pre-training method for a machine learning model to output features using an encoded dataset.
Figure 2C:
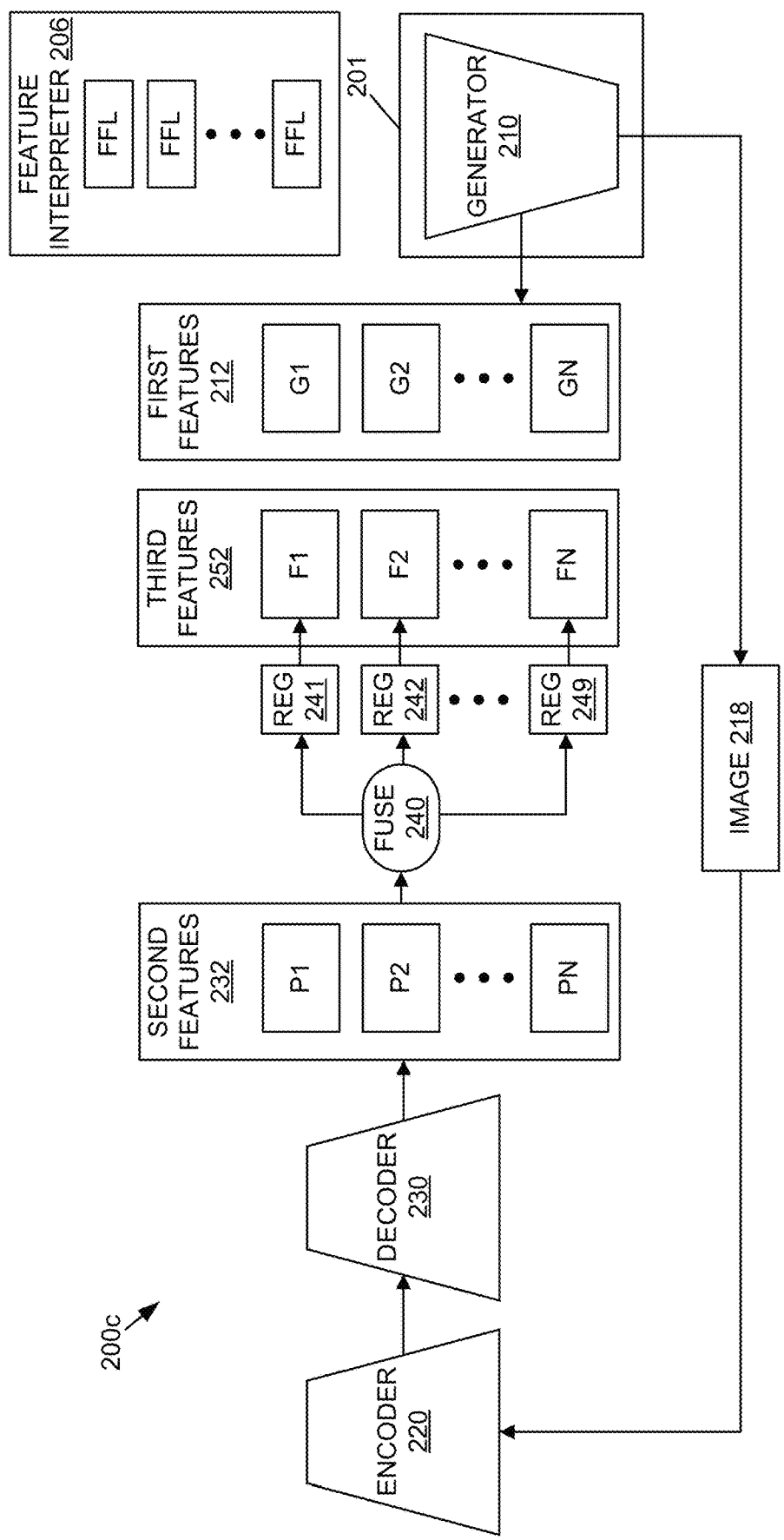
FIG. 2C is a block diagram of an example of an unsupervised pre-training method for a machine learning model to output features using labels.
Figure 3:
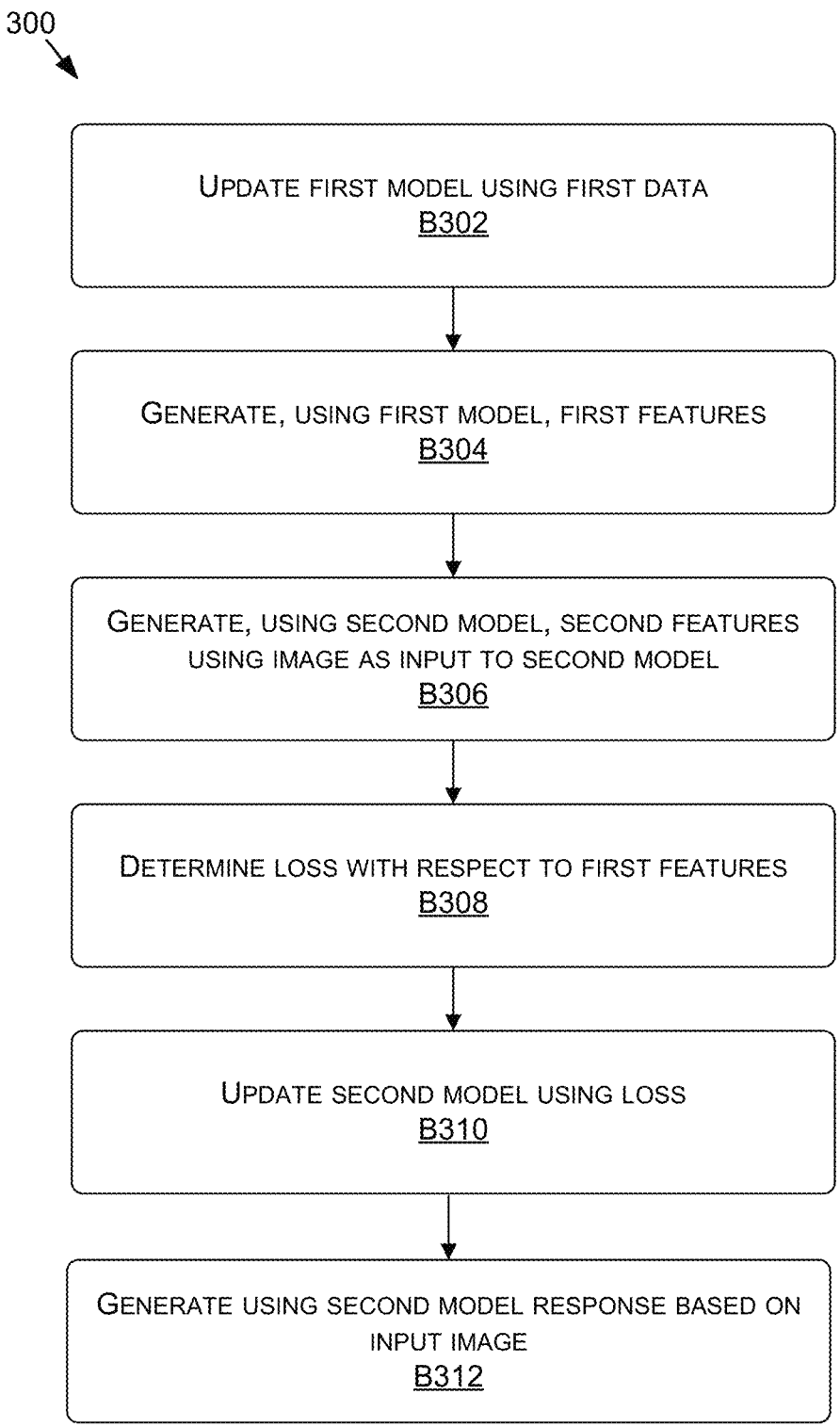
FIG. 3 is a block diagram of an example of an unsupervised pre-training method for a machine learning model to output features.

FIG. 2A is a block diagram of an example of an unsupervised pre-training method 200a for a machine learning model (e.g., the second model 104) to output features based on a synthesized dataset D. FIG. 2B is a block diagram of an example of an unsupervised pre-training method 200b for a machine learning model (e.g., the second model 104) to output features based on an encoded dataset D. FIG. 2C is a block diagram of an example of an pre-training method 200c for a machine learning model (e.g., the second model 104) to output features based on fractional labels. FIG. 3 is a block diagram of an example of an unsupervised pre-training method 300 for a machine learning model (e.g., the second model 104) to output features. Each block of methods 200a, 200b, 200c, and 300, described herein, can include one or more types of data or one or more types of computing processes that may be performed using any combination of hardware, firmware, and/or software. For instance, various functions may be carried out by a processor executing instructions stored in memory. The methods 200a, 200b, 200c, and 300 may also be embodied as computer-usable instructions stored on computer storage media. The methods 200a, 200b, 200c, and 300 may be provided by a standalone application, a service or hosted service (standalone or in combination with another hosted service), or a plug-in to another product, to name a few. In addition, the methods 200a, 200b, 200c, and 300 are described, by way of example, with respect to the system of FIG. 1. However, these methods may additionally or alternatively be executed by any one system, or any combination of systems, including, but not limited to, those described herein. The methods 200a, 200b, and 200c can each be a particular implementation of the method 300.

At B302, the training system 100 can update (e.g., train) the first model 102 using first data (e.g., the training data 108). In some embodiments, the first model 102 includes a generative model such as a generative model 201. Examples of the generative model 201 include a GAN, StyleGAN, BigGAN, CM-GAN, a diffusion model (e.g., DDPM), a transformer-based model, and so on.

Figure 4:
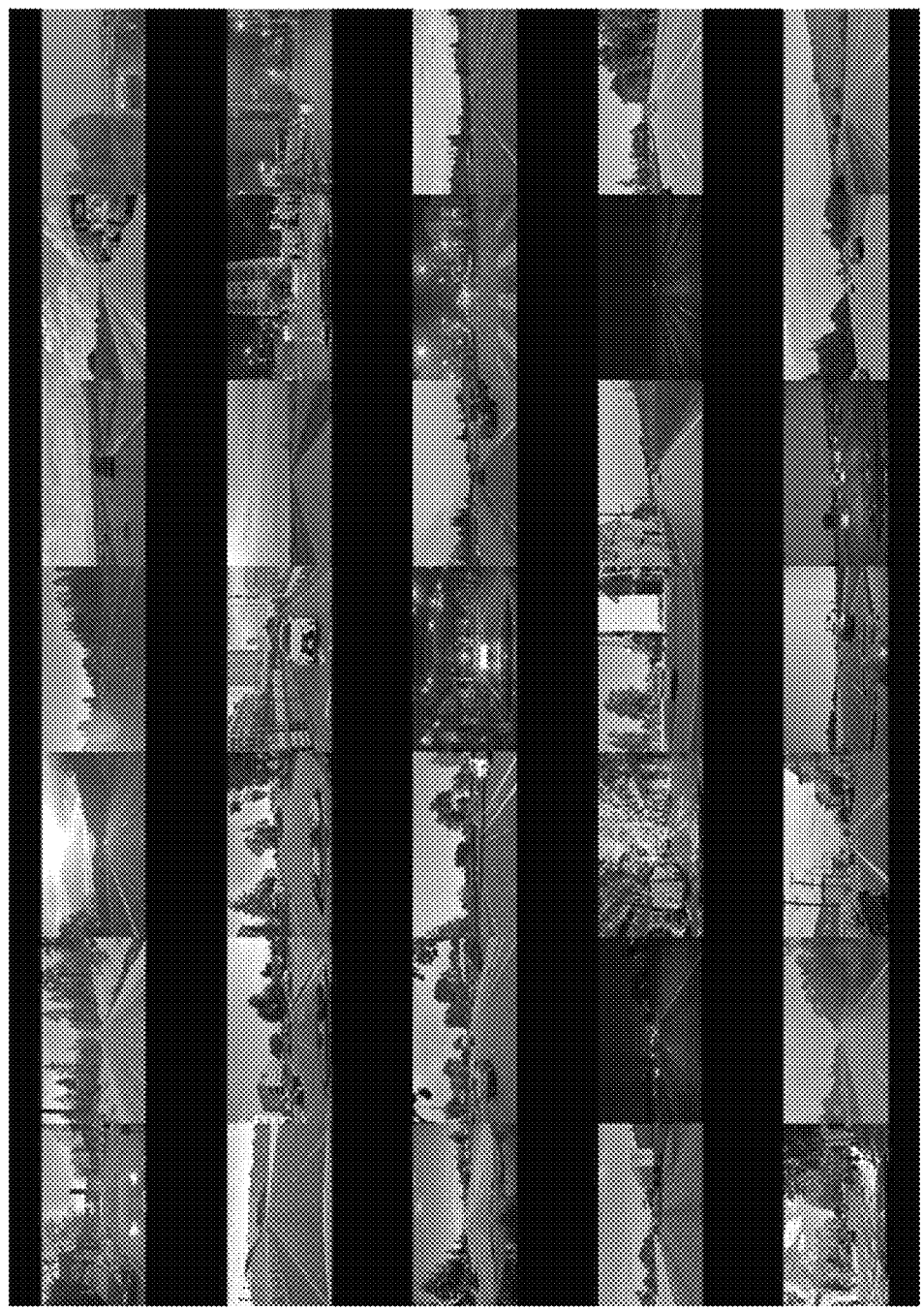
FIG. 4 is a diagram illustrating example images used to train a generative model.
Figure 4:

The first data can include unlabeled data, which includes images without any labels, referred to as unlabeled images. FIG. 4 is a diagram illustrating example images 400 used to train the first model 102. The unlabeled data (e.g., the images 400) can include at least one of unlabeled in-domain data or unlabeled general data. In the examples in which the downstream tasks involve applying inputs of images and videos from cameras on vehicles to the model 180 to output information for an AI driver of an autonomous vehicle, the unlabeled in-domain data can include images and videos obtained from one or more cameras on one or more vehicles provided to an AI driver of an autonomous vehicle. Accordingly, updating the first model 102 using unlabeled in-domain data can allow the first model 102 to be pre-trained using relevant dataset. The unlabeled general data can include images and videos different from the unlabeled in-domain data. Examples of the unlabeled general data can include unlabeled images or videos in a database, a third-party image service, and so on, where it is unknown or unclear whether such unlabeled images relate to or are curated for a downstream task such as applying inputs of images and videos from cameras on vehicles to the model 180 to output information for an AI driver of an autonomous vehicle. Accordingly, training the first model 102 using unlabeled general data can allow the first model 102 to be generally pre-trained using a large number of datasets that are available for training. After the first model 102 is trained, the training system 100 can perform B304.

Figure 5:
FIG. 5 is an example synthetic image that can be generated using a teacher model.

At B304, the training system 100 can generate, using the first model 102, the first features 212 using an image as input. In the examples shown in FIG. 2A, the first model 102 generates the second data (e.g., the training data 106) including the synthesized dataset having at least one image 214 and the first features 212 corresponding to each of the at least one image 214. The at least one image 214 generated by the first model 102 can include at least one synthetic image in the example in which the first model 102 is the generative model 201 such as GAN, StyleGAN, BigGAN, and CM-GAN. FIG. 5 is an example image 500 that can be generated using the generative model 201. For example, the image 500 can be a synthetic image. In some examples, the second data can be referred to as a feature dataset D, such as:

$$D = \{x_i, f_i^g\}_{i=1}^N, \quad (1)$$

where the feature dataset D includes $x_i$ synthetic images (e.g., the at least one image 214) and extracted features $f_i^g$ (e.g., the first features 212). In such examples, the feature dataset D is a synthesized dataset. The student model is trained using the feature dataset D by distilling the features $f_i^g$ into intermediate features $f(x_i)$, e.g., the second features 232 and the third features 252).

In the examples shown in FIG. 2A, generating the second data includes sampling a random noise and generating the at least one image 214 and the first features 212 according to the random noise. For example, the random noise can be a random N-dimensional vector determined using a Gaussian distribution. The random noise can be in an input space z 202, which is mapped to an intermediate space W 204 via a non-linear mapping function. The non-linear mapping network or function can be implemented using a multilayer perceptron (MLP). For example, the non-linear mapping network maps the random noise to the intermediate space W 204 to generate an intermediate latent code, which is then fed to the generator 210 to generate the at least one image 214. The random noise being injected into the generator 210 can improve the detail of the at least one image 214. In some examples, z 202 is sampled from a prior distribution of the generative model 201. The at least one image 214 generated in this manner can be referred to as sampled synthetic images.

In the examples in which the second data includes synthesized dataset D, the first features 212 are generated by recording the hierarchical intermediate features from the sampled output from the generative model 201 (e.g., GAN), where the hierarchical intermediate features are represented as:

$$f^g = \{f_i^g\}_{i=1}^L, \quad (2)$$

where l denotes the hierarchy level of the features from a maximum L levels.

In the examples shown in FIG. 2B, the first model 102 can generate the first features 212 in the example in which the first model 102 is the generative model 201 such as a diffusion model (e.g., DDPM). A real image 216 (labeled or unlabeled) can be passed to the diffusion model, which can encode (e.g., using an encoder 208) the input real image 216 by adding noise to the input real image 216 in diffusion, and then denoise using the generator 210 the resulting image back to the real image. Examples of the encoder 208 can include CNNs, ResNets, Cornet-S, transformer-based encoder, and so on. In some example embodiments, the generative model 201 is a combination of encoder and generator, such as Variational Autoencoder (VAE). The real images can be encoded into a latent space of the generative model 201 using a suitable encoding process, which yields a latent variable Z. That is, the encoder 208 outputs the latent variable Z. The feature dataset D generated in this manner is referred to as an encoded dataset. The generative process is run using the latent variable Z using the generator 210, and hierarchical intermediate features, referred to as the first features 212, from the generative model 201 are recorded. In the examples in which the generative model 201 is a diffusion model, the diffusion process is used to encode the real image 216. For example, T steps of forward diffusion process can be run, by the encoder 208, followed by a single denoising step to extract the hierarchical features $\{f_i^g\}$ from the intermediate layers of the denoising network, which can be a U-Net.

While the at least one image 214 is generated or while the at least one real image 216 is being encoded, the representation (e.g., the first features 212) of the at least one image 214 or 216 can be extracted as described. The first features 212 can include extracted representations or tensors, referred to as G1, G2, . . . , GN. The features G1, G2, . . . , GN can be high dimensional tensors, for example, with C=512, H, W=512×1024. The tensors may correspond to the information defining objects, color (e.g., RGB values), and so on. In one or more examples in which the generative model 201 is a CM-GAN, the first features 212 can include CM-based blocks. For example, the first features 212 can include a representation of an activation map (e.g., an intermediate activation map) or a feature map (e.g., an intermediate feature map) output from the generative model 201, such as from the generator 210. The first features 212 (e.g., each of the G1, G2, . . . , GN) has first attributes such as one or more of first spatial resolutions, first channel dimensions, or first feature dimensions.

Figure 6:
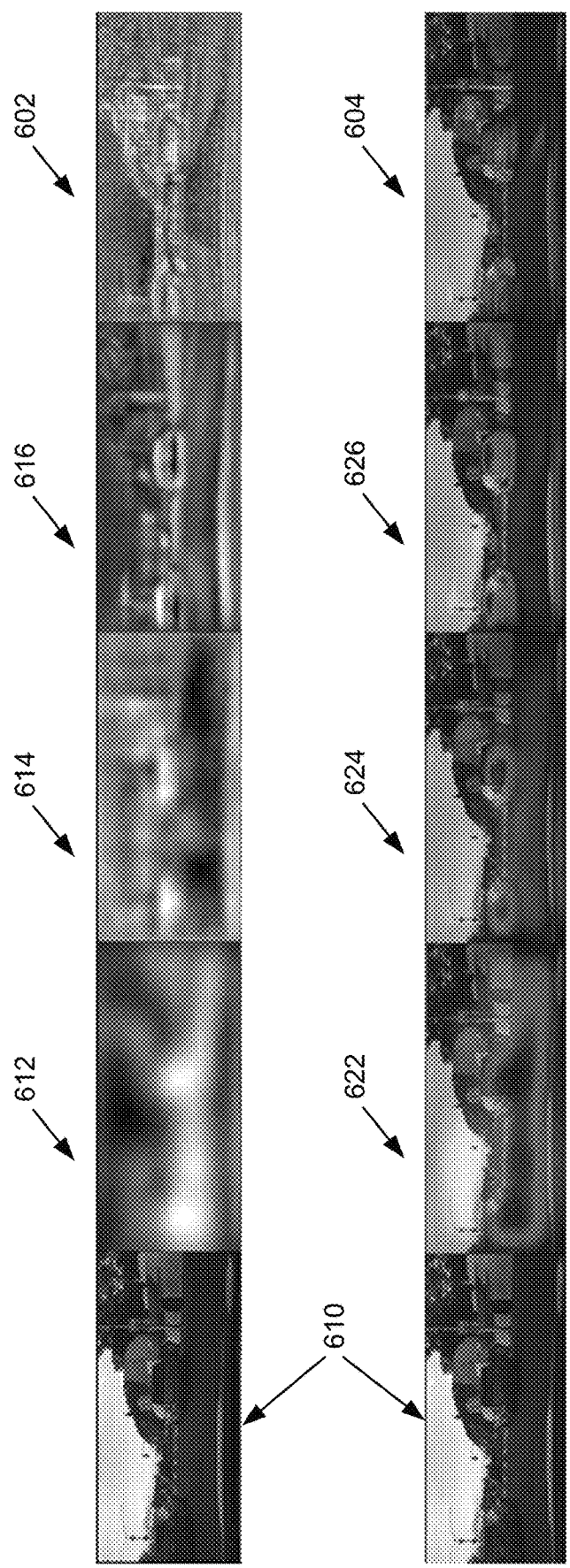
FIG. 6 is an example visualization of generating an intermediate feature map and an example visualization of generating an intermediate activation map.

FIG. 6 is an example visualization of generating an intermediate feature map 602 and an example visualization of generating an intermediate activation map 604. In some examples, the intermediate feature map 602 and the intermediate activation map 604 are generated by the generator 210 in the process of generating the synthetic image 610, which is an example of the at least one image 214, as shown in FIG. 2A. The generative model 201 used to create the synthetic image 610 can include GAN, StyleGAN, Big-GAN, CM-GAN, and so on. Based on the sampled noise, the generator 210 can generate intermediate feature maps 612, 614, and 616 that are increasing more detailed in terms of features, until the intermediate feature map 602 is generated. The intermediate feature maps 612, 614, 616, and 602 can visualize or represent the mean values corresponding to the respective features (e.g., tensors). Based on the sampled noise, the generator 210 can generate intermediate activation maps 622, 624, and 626 that are increasing more detailed in terms of activation, until the intermediate activation map 604 is generated. The intermediate activation maps 622, 624, 626, and 604 can represent or visualize the maximum activation values corresponding to the respective features (e.g., tensors). The synthetic image 610 and the corresponding features (e.g., at least one of the intermediate feature map 602 or the intermediate activation map 604) can constitute the training data 106.

Figure 7:
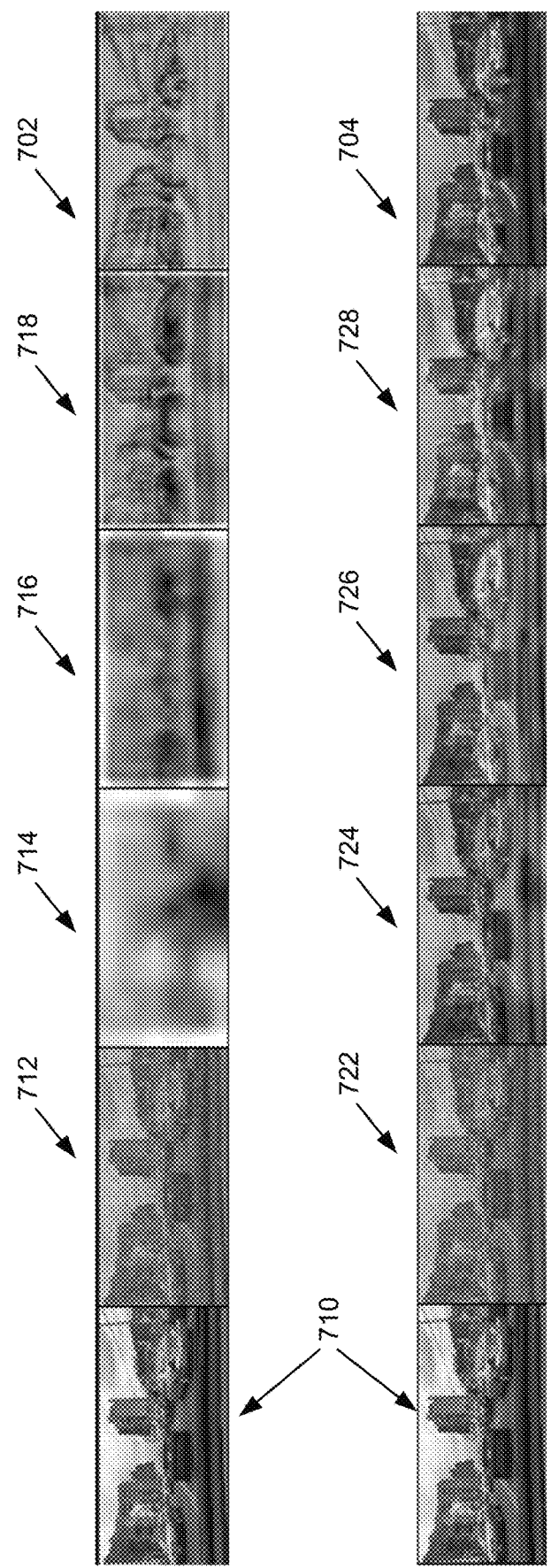
FIG. 7 is an example visualization of generating an intermediate feature map and an example visualization of generating an intermediate activation map.

FIG. 7 is an example visualization of generating an intermediate feature map 702 and an example visualization of generating an intermediate activation map 704. The intermediate feature map 702 and the intermediate activation map 704 may be generated by the generator 210 in the process of encoding the real image 710 by adding noise to the real image 710 in diffusion, and then denoising the resulting image back to the real image 710. The real image 710 is an example of the at least one image 214 that can be passed to the second model 104, as shown in FIG. 2B. The generative model 201 used to generate the intermediate feature map 702 and the intermediate activation map 704 can include a diffusion model (e.g., DDPM), and so on. Based on the real image 710, the generator 210 can generate intermediate feature maps 712, 714, 716, and 718 that are increasingly more noisy from the intermediate feature maps 712 and 714 in the diffusion steps and then increasingly denoised from the intermediate feature maps 714, 716, and 718 in denoising steps until the intermediate feature map 702 is generated. The intermediate feature maps 712, 714, 716, 718, and 702 can represent or visualize the mean values corresponding to the respective features (e.g., tensors). Based on the real image 710, the generator 210 can generate intermediate activation maps 722, 724, 726, and 728 that are increasingly more noisy from the intermediate activation maps 722 and 724 in the diffusion steps and then increasingly denoised from the intermediate activation maps 724, 726, and 728 in denoising steps until the intermediate activation map 704 is generated. The intermediate activation maps 722, 724, 726, 728, and 704 can represent or visualize the maximum activation values corresponding to the respective features (e.g., tensors). The real image 710 and the corresponding features (e.g., at least one of the intermediate feature map 702 or the intermediate activation map 704) can constitute the training data 106.

In some examples, both synthesized feature data sets and encoded feature datasets can be pre-computed offline or created online while training the second model 104. In some examples, online sampling for synthesized datasets and online encoding for encoded datasets allow fast in-memory access and efficient materialization and removal of samples and corresponding high-dimensional features. This allows scaling the pre-training with datasets and features of any size without additional pre-processing and storage costs. Online encoding can be employed when stochastic encoding techniques in diffusion models are used given that an offline dataset can store only one or a few samples from all possible stochastic encodings of a real image.

At B306, the training system 100 can generate, using the second model 104, second features 232 using the image (e.g., the at least one image 214 or the at least one image 216) as input to the second model 104. The first model 102 and the second model 104 can be different types of models. The second model 104 can include an encoder 220 in some embodiments. In some embodiments, the second model 104 can include the encoder 220 and a decoder 230. The second model 104 can apply the image 214 as input and can produce an output including the second features 232.

For example, the encoder 220 receives the image 214 or 216 and can extract features such as representative information, based on convolution. The encoder 220 can generate high-level feature maps representing certain context information of multi-scales. The extraction operation may reduce the resolution of the image 214 or 216. Examples of the encoder 220 can include CNNs, ResNets, Cornet-S, transformer-based encoder, and so on. The decoder 230 can up-sample the extracted features to increase the resolution of the output features, which includes the second features 232. In some examples, the encoder 220 and the decoder 230 can be arranged in a pyramid structure using a pyramid pooling module (PPM).

In some examples, the second model 104 can include the encoder 220 as well as the decoder 230 as part of the pre-training, and the model 180 can include the encoder 220 and not the decoder 230. The knowledge from the first model 102 can be distilled or passed to the encoder 220 as facilitated by the decoder 230, where the downstream task performed by the model 180 (e.g., image recognition, object identification, object detection, segmentation, and so on) involves the encoder 220 and not the decoder 230 for example. In some examples, the second model 104 can include the encoder 220 and the decoder 230, and the model 180 includes the encoder 220 and the decoder 230. The knowledge from the first model 102 can be distilled to the encoder 220 and the decoder 230, and the downstream task performed by the model 180 can involve the encoder 220 and the decoder 230.

The second features 232 can include extracted representations or tensors, referred to as P1, P2, . . . , PN. Examples of the second features 232 can include multiscale features output by the decoder 230. The second features 232 (e.g., each of the P1, P2, . . . , PN) can have second attributes such as one or more of second spatial resolutions, second channel dimensions, or second feature dimensions. In some examples, a first spatial resolution of the first feature 212 can be different from (e.g., higher than) a second spatial resolution. In some examples, a first channel dimension of the first feature 212 can be different from (e.g., higher than) a second channel dimension. In some examples, the first feature dimension of the first feature 212 can be different from (e.g., higher than) the second feature dimension.

In some examples, the training system 100 aligns (e.g., scales) the second attributes of the second features 232 to the first attributes of the first features 212. This can include fusing, using one or more neural network blocks, the second features 232 into a fused feature 240 and generating third features 252 from the fused feature 232. The third features 252 can be generated from the fused feature 240 using the regressors 241, 242, . . . , 249. The third features 252 can include extracted representations or tensors, referred to as F1, F2, . . . , FN. The features F1, F2, . . . , FN can be high dimensional tensors, for example, with C=512, H, W=512× 1024.

The third features 252 (e.g., each of the F1, F2, . . . , FN) can have third attributes that align with the first attributes. Examples of the third features 252 can include multiscale features such as features having third attributes such as one or more of third spatial resolutions, third channel dimensions, or third feature dimensions. In some examples, a first spatial resolution of the first feature 212 can be the same as a third spatial resolution. In some examples, a first channel dimension of the first feature 212 can be the same as a third channel dimension. In some examples, the first feature dimension of the first feature 212 can be the same as the third feature dimension.

In some examples, each of the regressors 241, 242, . . . , 249 performs up-sampling, which may include, for example and without limitation, bilinear up-sampling or transpose convolution to match the dimensionality of the second attributes to the dimensionality of the first attributes, via for example one-by-one convolution. In some examples, the regressors 241, 242, . . . , 249 can receive multi-level features outputted from the vision backbone and use a top-down architecture with lateral skip connections to fuse the multi-level features and output multiscale features. For example, the PPM from PSPNet can be applied on the last layer of the image backbones before a feature pyramid network (FPN) branch to enhance feature mixing.

At B308, the training system 100 can determine the loss (associated with the second features) with respect to the first features 212. The loss can include one or more of attention loss, feature regression loss, knowledge distillation loss, softmax loss, and so on. In some examples, the overall or total loss can be calculated to be the sum or combination of one or more of the types of loss. For example, the overall loss for a feature $\mathcal{L}_{feat}$ can be determined using the following expression:

$$\mathcal{L}_{feat} = \mathcal{L}_{MSE} + \lambda_{AT}\mathcal{L}_{AT}, \qquad (3)$$

where $\mathcal{L}_{MSE}$ is the regression loss (by mean square), $\mathcal{L}_{AT}$ is the attention loss, and $\lambda_{AT}$ controls the weighting of $\mathcal{L}_{AT}$.

For example, the attention loss between first features 212 (e.g., the intermediate activation map such as the activation map 600) and the second features 232, which distills a one-dimensional attention map per spatial feature, can be determined. For each channel dimension of a first feature 212 (e.g., each of G1, G2, . . . and GN), the maximum activation (e.g., the maximum activated pixel in the feature space) can be identified. For each channel dimension of a second feature 232 (e.g., each of P1, P2, . . . and PN), the maximum activation (e.g., the maximum activated pixel in the feature space) can be identified. A first attention loss may be determined using the maximum activation for the first feature G1 and the maximum activation for a second feature P1, a second attention loss may be determined using the maximum activation for the first feature G2 and the maximum activation for a second feature P2, . . . , an Nth attention loss is determined using the maximum activation for the first feature GN and the maximum activation for a second feature PN. The attention loss can measure or determine the degree to which the second model 104 (e.g., at least one of the encoder 220 or the decoder 230) can mimic the feature activation of the first model 102 (e.g., the generative model 201). For example, the attention loss $\mathcal{L}_{AT}$ can be determined by:

$$\mathcal{L}_{AT} = \frac{1}{L}\sum_{l}^{L}\sum_{j\in I}\left\|\frac{Q_{l,j}^r}{\|Q_{l,j}^r\|_2} - \frac{Q_{l,j}^g}{\|Q_{l,j}^g\|_2}\right\|_p, \qquad (4)$$

where $$Q_{l,j}^r = vec(F_{sum}^p(f_{l,j}^r)), \qquad (5)$$

$$Q_{l,j}^g = vec(F_{sum}^p(f_{l,j}^g)), \qquad (6)$$

and where operator $F_{sum}^p(A)$ is defined as:

$$F_{sum}^p(A) = \sum_{i}^{C}|A_i|^p. \qquad (7)$$

The operator $F_{sum}^{p}(A)$ is the sum of the power p of absolute values of the feature activation A across channel dimension C. Such operator can be used to improve convergence speed over regressing high-dimensional features directly. $Q_{l,j}^{r}$ and $Q_{l,j}^{g}$ are respectively the j-th pair in layer l of the second feature 232 and the first features 212 in vectorized form.

Moreover, and as an example, the regression loss between the first features 212 (e.g., intermediate feature map such as the feature map 700) and the third features 252 can be determined. For example, 1×1 convolution can be used to match the number of channels in the third features 252 to the number of channels in the first features 212, if the number of channels in the first features 212 and the number of channels in the third features 252 are different. Given that the first features 212 and third features 252 are aligned to have the same attributes or dimensionality such as the same spatial resolutions, channel dimensions, and/or feature dimensions, mean square error can be employed to determine the regression loss. The regression loss can represent or measure the preservation of the context or the features themselves of the first model 102 (e.g., the generative model 201) by the second model 104 (e.g., at least one of the encoder 220 or the decoder 230). For example, a first regression loss (e.g., first mean square error) can be determined between the first feature G1 and third feature F1, a second regression loss (e.g., second mean square error) can be determined between the first feature G2 and third feature F2, ..., an Nth regression loss (e.g., Nth mean square error) can be determined between the first feature GN and third feature FN. For example, the regression loss (by mean square) $\mathcal{L}_{MSE}$ can be determined by:

$$\mathcal{L}_{MSE} = \frac{1}{L}\sum_{l}^{L}\|f_{l}^{r} - W(f_{l}^{g})\|_{2}^{2}, \qquad (8)$$

where $f_{l}^{g}$ denotes the first features 212, $f_{l}^{r}$ denotes the third features 252, W is a non-learnable whitening operator implemented as a LayerNorm, which can normalize differing feature magnitudes across layers. Layer number l can include for example 2, 3, 4, and 5, corresponding to the features at $2^{l}$; stride relative to an input resolution.

In addition, the knowledge distillation loss between the first features 212 (e.g., intermediate feature map such as the feature map 700) and the third features 252 can be determined. Referring to FIG. 2C, in the semi-supervised training methods, a fraction (e.g., at least some) of downstream task labels are available for pre-training. In this case, a task-dependent branch, referred to as a feature interpreter, can be disposed on top of a frozen generative model 201 in a supervised manner, similar to DatasetGAN. Soft label distillation can be used for the image 218 which can be either or both encoded and synthesized datasets. That is, the image 218 can be at least one synthetic image or real image. The feature dataset D can include predicted soft labels. In some examples, the interpreter 206 receives the first features 212 (e.g., the multi-level features) outputted from the generator 210 as input and feeds the first features 212 into a series of Feature Fusion Layers (FFLs) to lower the feature dimension and fuse with the next-level features, to output per-pixel logits. That is, each first feature G1, G2, ..., GN is associated with a level and is fed into a corresponding FFL to lower the feature dimension of that first feature, and fuse with the next level feature, and so on, and output per-pixel logits after fusing into the same level. Each FFL can run a current feature into a 1×1 convolution to generate an output, which is then resized and concatenated with a previous feature, the result of the concatenation is run though depth-wise separable (DWS) convolutions, Group Norm, and Swish activation. In other words, the end result of the feature interpreter 206 is the teacher label prediction.

In some embodiments, the interpreter 206 can be trained with segmentation or fractional labels, which are some of the labels used in the downstream tasks. For example, the loss of the interpreter can be determined using:

$$\mathcal{L}_{interpreter} = \mathcal{H}(I_{\theta}(f_{l}^{g}, y) + \lambda_{d}\mathcal{D}(I_{\theta}(f_{l}^{g}, y)), \qquad (9)$$

where $I_{\theta}$ are the weights associated with the interpreter 206, y is the task label, $\mathcal{H}(\bullet,\bullet)$ denotes pixel-wise cross-entropy loss, and $\mathcal{D}(\bullet,\bullet)$ is Dice Loss. $\lambda_{d}$ is a hyper parameter to weigh the dice loss.

For example, the third features 252 (e.g., each of F1, F2, ..., FN) can be passed through a logit head to generate student parameter(s), such as the student labels. The knowledge (e.g., label) distillation loss $\mathcal{L}_{ld}$ can be determined by:

$$\mathcal{L}_{ld} = \mathcal{H}(P_{\tau}^{g}, P_{\tau}^{r}), \qquad (10)$$

where $P_{\tau}^{g}$ is the logit from the feature interpreter and $P_{\tau}^{r}$ is the logit determined by the second model 104 (e.g., the vision backbone). $\mathcal{H}$ denotes entropy loss, and t refers to temperature that controls the sharpness of the output distribution. In some examples, a mixed distillation loss $\mathcal{L}_{mix}$ over all images in the pre-training dataset can be determined by:

$$\mathcal{L}_{mix} = \mathcal{L}_{feat} + \lambda_{ld}\mathcal{L}_{ld}, \qquad (11)$$

where $\lambda_{ld}$ is a hyper parameter controlling the weighting between the different types of losses. In some examples, annotated labels are used only for training the feature interpreter 206, and soft labels from the feature interpreter 206 are used for pre-training the second model 104 with distillation.

In some examples in which the first features 212 include discretization layers, a softmax loss can be determined between the first features 212 (e.g., each of G1, G2, ..., GN) and the third features 252 (e.g., each of F1, F2, ..., FN).

At B310, the training system 100 can update the second model 104 using the loss. For example, the training system 100 can train the second model 104 (e.g., the encoder 220 or the combination of the encoder 220 and the decoder 230) by modifying or updating one or more parameters, such as weights and/or biases, of various nodes of the second model 104 responsive to evaluating candidate outputs (e.g., the second features 232 and the third features 252) of the second model 104 based on the loss as described herein.

At B312, the application system 150 can use the model 180, which includes the second model 104, to generate a response (e.g., the output response 188) based on an input image (e.g., an image or a frame of a video outputted by the camera 154 or received/retrieves from another suitable device, memory storage, database, and so on. The output response 188 can include features such as tensors determined from the input image for tasks such as image recognition, object identification, object detection, segmentation, and so on.

Figure 8:
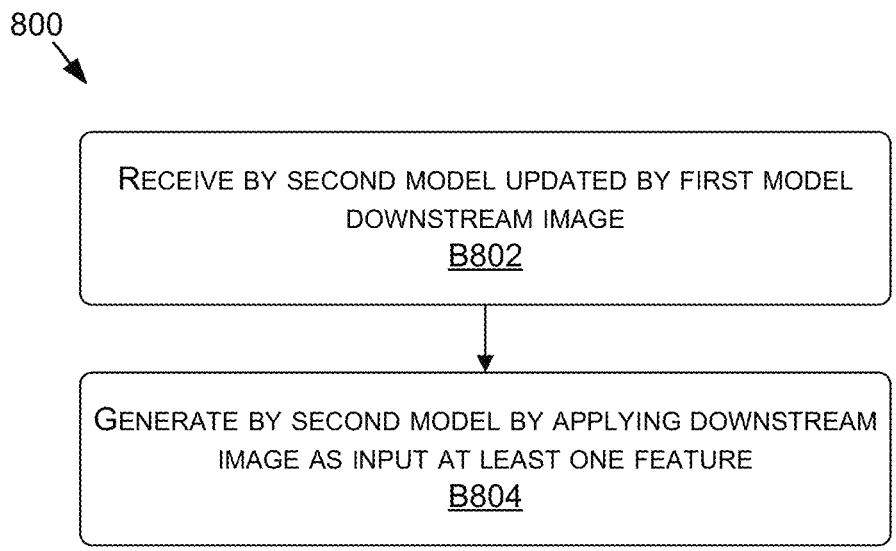
FIG. 8 is a flow diagram showing an example method for using a machine learning model to generate outputs based on an input image.

FIG. 8 is a flow diagram showing an example method 800 for using a machine learning model to generate outputs based on an input image. Each block of method 800, described herein, includes one or more types of data or one or more types of computing processes that may be performed using any combination of hardware, firmware, and/or software. For instance, various functions may be carried out by a processor executing instructions stored in memory. The method 800 may also be embodied as computer-usable instructions stored on computer storage media. The method 800 may be provided by a standalone application, a service or hosted service (standalone or in combination with another hosted service), or a plug-in to another product, to name a few. In addition, the method 800 is described, by way of example, with respect to the system of FIG. 1. However, these methods may additionally or alternatively be executed by any one system, or any combination of systems, including, but not limited to, those described herein.

At B802, the model 180 can receive a downstream image. The downstream image may be an in-domain image or a frame of video that the model 180 receives in performing a downstream task after the model 180 is sufficiently trained. The model 180 may be the second model 104 updated or pre-trained using the first model 102 in the manner described herein. The downstream image can include the model compliant input provided by the dataset generator 176 for instance. At 804, the model 180 can generate, by applying the downstream image as input, at least one feature. The at least one features can include the output response 188.

Example Computing Device

Figure 9:
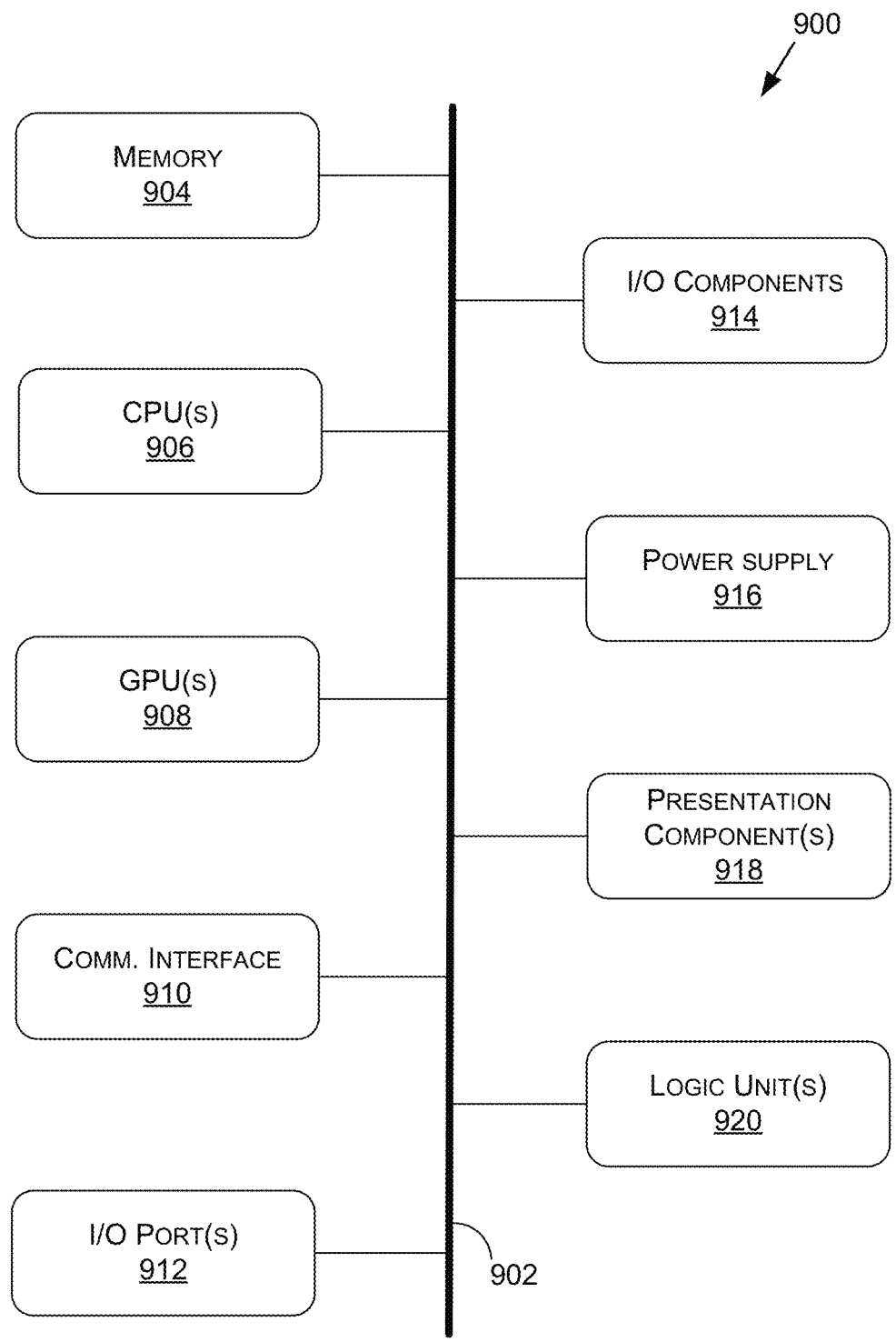
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. The computing device(s) 900 are example implementations of the training system 100 and/or the application system 150. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908. Examples of the logic unit(s) 920 include the first model 102, the second model 104, the training system 100, the data processor 172, the dataset generator 176, the model 180, the application system 150, and so on.

Examples of the logic unit(s) 920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The computing device 900 may be include depth cameras, such as stereoscopic camera systems, infrared camera systems, RGB camera systems, touchscreen technology, and combinations of these, for gesture detection and recognition. The I/O components 914 can include the camera 154 for generating images and videos. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.).

Example Data Center

Figure 10:
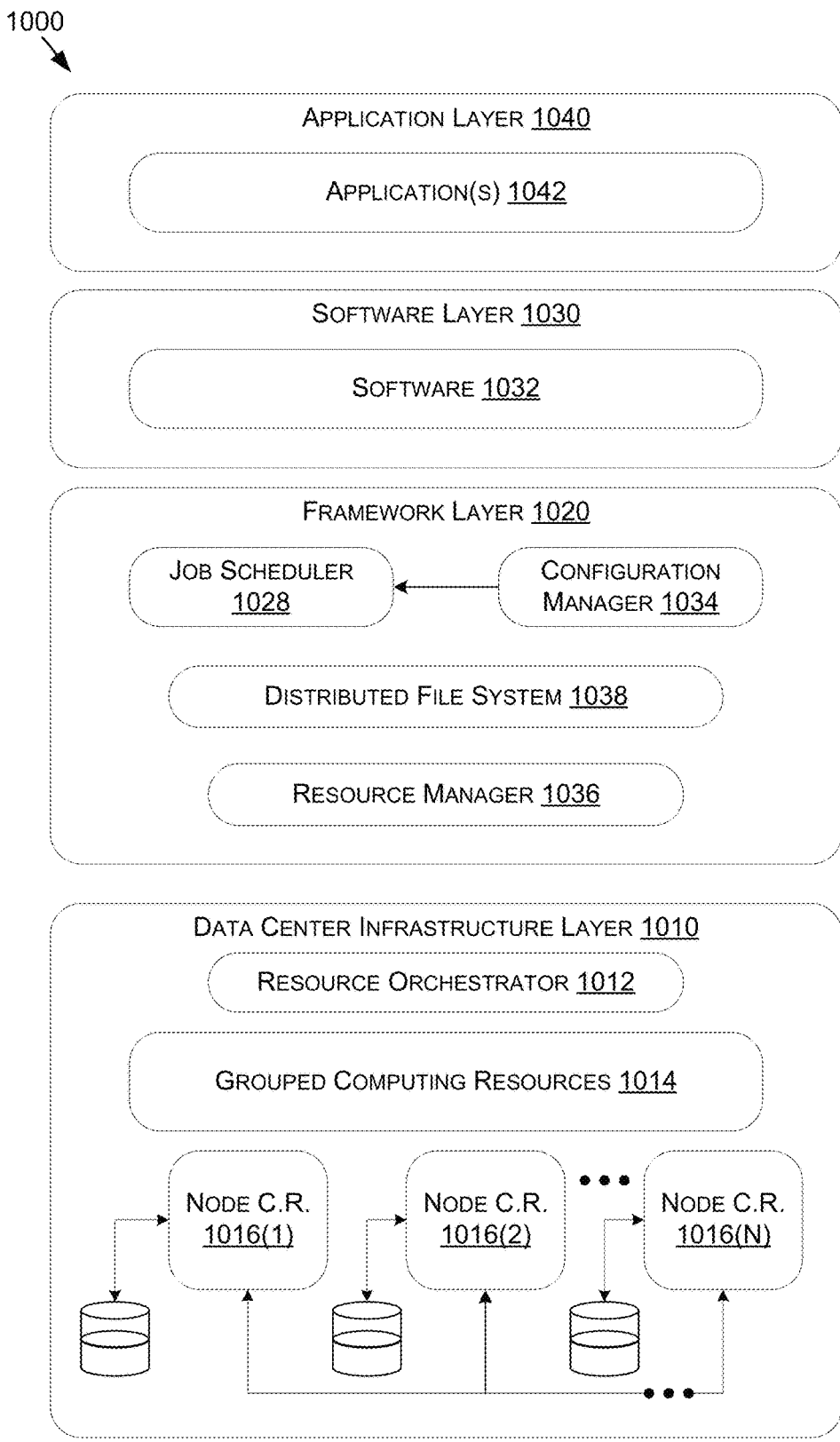
FIG. 10 is a block diagram of an example data center suitable for use in implementing some embodiments of the present disclosure.

FIG. 10 illustrates an example data center 1000 that may be used in at least one embodiments of the present disclosure, such as to implement the training system 100 or the application system 150 in one or more examples of the data center 1000. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-1016(N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1028, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark (hereinafter "Spark") that may utilize distributed file system 1038 for large-scale data processing (e.g., "big data"). In at least one embodiment, job scheduler 1028 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1028. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments, such as to perform training of the second model 104 and/or operation of the model 180.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models (e.g., train the second model 104) or predict or infer information using one or more machine learning models (e.g., the model 180) according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:
one or more circuits to:
generate, using a first model, a first plurality of features using an image as an input, the first model being updated using a loss corresponding to the first plurality of features determined with respect to a second plurality of features, and wherein the second plurality of features is generated using a second model and corresponding to the image, wherein the one or more circuits are to align one or more first attributes of the first plurality of features to one or more second attributes of the second plurality of features by:
fusing the first plurality of features into a fused feature; and
generating a third plurality of features from the fused feature, the third plurality of features having one or more third attributes aligned with the one or more second attributes.

2. The processor of claim 1, wherein:
the first model comprises at least one of: an encoder or a decoder; and
the second model comprises a generative model.

3. The processor of claim 1, wherein generating the image comprises:
sampling a random noise; and
generating the image and the second plurality of features according to the random noise.

4. The processor of claim 1, wherein:
the second model comprises a diffusion model; and
the image is a real image.

5. The processor of claim 4, wherein the generating the second plurality of features comprises encoding the real image by adding noise to the real image to obtain a resulting image and denoising the resulting image to obtain the real image.

6. The processor of claim 1, wherein the one or more circuits are to update the second model using unlabeled data, the unlabeled data comprising unlabeled data for a domain, or unlabeled data for more than one domain.

7. The method of claim 1, wherein the second plurality of features comprises a representation, from the second model, of at least one of an activation map or feature map.

8. The processor of claim 1, wherein the first plurality of features comprises one or more multiscale features.

9. The processor of claim 1, wherein the one or more circuits are to determine the loss corresponding to the first plurality of features with respect to the second plurality of features by determining an attention loss between the first plurality of features and the second plurality of features, the second plurality of features comprising a representation of an activation map.

10. The processor of claim 1, wherein the one or more circuits are to determine a loss corresponding to the first plurality of features with respect to the second plurality of features by:
determining a third plurality of features using the second plurality of features; and
determining a regression loss between the second plurality of features and the third plurality of features, the second plurality of features comprising a representation of a feature map.

11. The processor of claim 1, wherein the one or more circuits are to determine a loss corresponding to the first plurality of features with respect to the second plurality of features by:
determining a third plurality of features using the plurality of first features; and
determining a knowledge distillation loss between the second plurality of features and the third plurality of features.

12. The processor of claim 11, wherein the knowledge distillation loss is determined based at least on one or more first labels generated using the first model and one or more second labels generated using an interpreter from the second plurality of features.

13. A processor comprising:
one or more circuits to:
generate, using a first model, a first plurality of features using an image as an input, the first model being updated using a loss corresponding to the first plurality of features determined with respect to a second plurality of features, and wherein the second plurality of features is generated using a second model and corresponding to the image, wherein:
the first plurality of features has one or more first attributes comprising at least one of a first spatial resolution, a first channel dimension, or a first feature dimension;
the second plurality of features has one or more second attributes comprising at least one of a second spatial resolution, a second channel dimension, or a second feature dimension; and
at least one of:
the first spatial resolution is different from the second spatial resolution;
the first channel dimension is different from the second channel dimension; or
the first feature dimension is different from the second feature dimension.

14. The processor of claim 13, wherein
the one or more second attributes comprises at least one of a second spatial resolution, a second channel dimension, or a second feature dimension;
the one or more third attributes comprising at least one of a third spatial resolution, a third channel dimension, or a third feature dimension; and
at least one of:
the second spatial resolution is same as the third spatial resolution;
the second channel dimension is same as the third channel dimension; or
the second feature dimension is same as the third feature dimension.

15. A method for using a first model updated using a second model, comprising:
generating a first plurality of features using a first model by applying the image as an input, the first model is updated using a loss corresponding to the first plurality of features determined with respect to a second plurality of features, the second plurality of features being generated using the second model and corresponding to an image, wherein the one or more circuits are to align one or more first attributes of the first plurality of features to one or more second attributes of the second plurality of features by:
fusing, using one or more neural network blocks, the first plurality of features into a fused feature; and
generating a third plurality of features from the fused feature, the third plurality of features having one or more third attributes, the one or more third attributes aligning with the one or more second attributes.

16. A processor comprising:
one or more circuits to:
- generate, using a first model, a plurality of first features corresponding to an image;
- generate, using a second model, a plurality of second features using the image as an input to the second model;
- determine a loss corresponding to the plurality of second features with respect to the plurality of first features, comprising determining an attention loss between the plurality of first features and the plurality of second features, the plurality of first features comprising a representation of an activation map;
- update the second model using the loss; and
- generate, using the second model, a response based on an input image.

17. The processor of claim 16, wherein the one or more circuits are to align one or more second attributes of the plurality of second features to one or more first attributes of the plurality of first features by:
- fusing, using one or more neural network blocks, the plurality of second features into a fused feature; and
- generating a plurality of third features from the fused feature, the plurality of third features having third attributes, the third attributes aligning with the first attributes.

18. A processor comprising:
one or more circuits to:
- generate, using a first model, a plurality of first features corresponding to an image;
- generate, using a second model, a plurality of second features using the image as an input to the second model;
- determine a loss corresponding to the plurality of second features with respect to the plurality of first features;
- update the second model using the loss; and
- generate, using the second model, a response based on an input image, wherein the one or more circuits are to determine the loss of the plurality of second features with respect to the plurality of first features by:

determining a plurality of third features using the plurality of first features; and determining a regression loss between the plurality of first features and the plurality of third features, the plurality of first features comprising a representation of a feature map.

* * * * *